(12) United States Patent
Schellens (10) Patent No.: US 10,479,282 B2
(45) Date of Patent: Nov. 19, 2019

(54) ACCESSORY MOUNT FOR A VEHICLE

(71) Applicant: Thomas E. Schellens, Old Lyme, CT (US)

(72) Inventor: Thomas E. Schellens, Old Lyme, CT (US)

( * ) Notice: Subject to any disclaimer, the term of this patent is extended or adjusted under 35 U.S.C. 154(b) by 0 days.

(21) Appl. No.: 16/003,224

(22) Filed: Jun. 8, 2018

(65) Prior Publication Data

US 2018/0370447 A1    Dec. 27, 2018

Related U.S. Application Data (60) Provisional application No. 62/522,775, filed on Jun. 21, 2017.

(51) Int. Cl.
| | | |
|---|---|---|
| *B60R 9/00* | (2006.01) | |
| *B60R 9/04* | (2006.01) | |
| *B60R 9/06* | (2006.01) | |
| *B60R 9/058* | (2006.01) | |
| *B60R 11/00* | (2006.01) | |

(52) U.S. Cl.
CPC ............... *B60R 9/04* (2013.01); *B60R 9/058* (2013.01); *B60R 9/06* (2013.01); *B60R 11/00* (2013.01); *B60R 2011/004* (2013.01)

(58) Field of Classification Search
CPC .. B60R 9/04; B60R 9/058; B60R 9/06; B60R 11/00; B60R 2011/004
USPC ........................................................ 224/327
See application file for complete search history.

(56) References Cited

U.S. PATENT DOCUMENTS

| 2,779,524 | A |   | 1/1957  | Carlson ........................... 224/492 |
| 4,179,154 | A | * | 12/1979 | Ingram .................. B60J 1/2008 296/91 |
| 5,130,906 | A | * | 7/1992  | Lund ........................ B60J 3/002 296/95.1 |
| 5,360,253 | A | * | 11/1994 | Sasaki .................. B62D 35/007 296/180.1 |
| 5,918,929 | A | * | 7/1999  | Vagis ........................ B60R 9/04 296/210 |
| 6,530,621 | B1 |   | 3/2003  | Williams et al. .......... 296/16.04 |
| 7,399,024 | B2 |   | 7/2008  | Ordonio, Jr. et al. ..... 296/180.1 |
| 8,511,526 | B2 | * | 8/2013  | Schellens ............. B60Q 1/2611 224/282 |
| 8,567,649 | B1 |   | 10/2013 | Cabak .......................... 224/312 |
| 8,575,662 | B2 |   | 11/2013 | Masuoka et al. ............ 280/756 |

(Continued)

OTHER PUBLICATIONS

Printed Advertisement, "CTLM Cab-Top Light Mount", BAJA Champions, one page.

(Continued)

*Primary Examiner* — Peter N Helvey (74) *Attorney, Agent, or Firm* — Fattibene and Fattibene. LLC; Paul A. Fattibene (57) ABSTRACT

An accessory mount mountable to a roof of a vehicle with the use of an existing brake light opening. The accessory mount has a horizontal mounting surface and a vertical mounting surface. Accessories, such as lights, may be mounted on the mounting surfaces. A shaped clamp is placed through the existing brake light opening and when rotates the horizontal mounting surface tightly against the roof of the vehicle securely attaching the accessory mount to the vehicle without the need for making any additional holes in the vehicle.

11 Claims, 11 Drawing Sheets

(56) References Cited

U.S. PATENT DOCUMENTS 9,162,628 B2    10/2015    Schellens ................. B60R 9/04
10,112,658 B2 *  10/2018    Yoon .................... B62D 35/007

OTHER PUBLICATIONS

2008 Catalog, Bully, Pilot Automotive, Cover page, p. 54, and last page.

* cited by examiner

ACCESSORY MOUNT FOR A VEHICLE

RELATED APPLICATION

This application claims the benefit of U.S. Provisional Application No. 62/522,775 filed Jun. 21, 2017, which is incorporated herein by reference.

FIELD OF THE INVENTION

The present invention relates in general to in accessory mount for a vehicle, and particularly to in accessory mount attached to a vehicle using an existing opening.

BACKGROUND OF THE INVENTION

It is often desirable to mount accessories to a motor vehicle, such as a truck or sport utility vehicle, SUV. While there are many attachments used to mount accessories onto vehicles many often require modification or drilling of additional holes or openings in the vehicle. This often makes mounting of an accessory more difficult and results in an opening left in the vehicle upon removing the accessory. One mount addressing these problems is disclosed in U.S. Pat. No. 9,162,628 issuing to Thomas Schellens on Oct. 20, 2015, which is herein incorporated by reference. Therein disclosed is a vehicle mounting platform that uses an existing opening, such as a brake light opening, in a vehicle for mounting a platform. While this vehicle mounting platform has been successful, there is a need for an improved vehicle mounting platform that is efficiently manufactured and easily attached to the vehicle with an existing opening in the vehicle.

SUMMARY OF THE INVENTION

The present invention is an accessory mount that has a horizontal and vertical surface for mounting accessories to a vehicle, and in particular the roof. The accessory mount uses an existing opening in the vehicle for attachment, and in particular a brake light opening. The body of the accessory mount is a single piece having multiple bends or folds. Side plates are used on each end of the body and conform to the curvature of the roof of the vehicle. A shaped clamp having an intermediate fastener is placed within the existing opening, positioned, and secured from the exterior of the vehicle.

Accordingly, it is an object of the present invention to attach the accessory mount to an existing opening of a vehicle.

It is an advantage of the present invention that it is easy to install and securely held onto the vehicle.

It is another advantage of the present invention that it is made with a minimum of parts and is easily assembled.

It is yet another advantage of the present invention that a shaped clamp causes the accessory mount to rotate into a secure position during installation.

Is a feature of the present invention that the shaped clamp is entirely held within the vehicle.

It is another feature of the present invention that the shaped clamp has an upper foot, a body, and a lower foot.

It is another feature of the present invention that the body of the accessory mount is a single piece and adapts to the shape of the vehicle.

It is yet another feature of the present invention that the side plates conform to the shape of the vehicle.

It is yet another feature of the present invention that the accessory mount has both a horizontal surface and a vertical surface for mounting an accessory.

These and other, objects, advantages, and features will become more readily apparent in view the following detailed description.

DETAILED DESCRIPTION OF THE PREFERRED EMBODIMENTS

Figure 1:
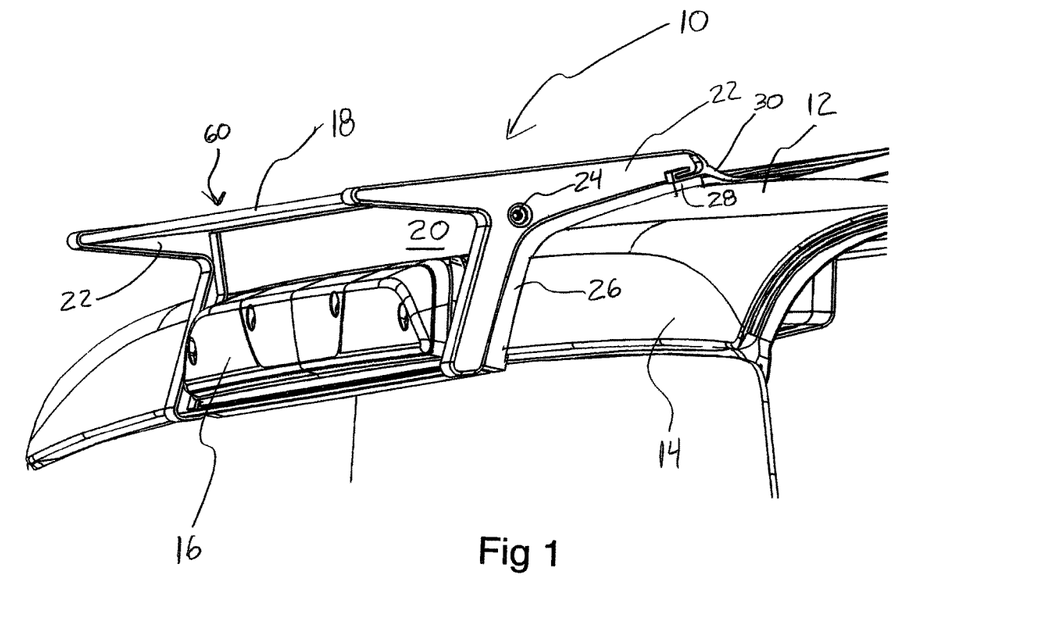
FIG. 1 is a perspective view schematically illustrating the present invention attached to a vehicle.

FIG. 1 illustrates the present invention attached to the roof of a vehicle. The accessory mount 10 is attached to the vehicle roof 12 that has a vertical drop section 14. The accessory mount 10 has a body 60 with a horizontal mounting surface 18 and a vertical mounting surface 20. A brake light 16 is attached adjacent the vertical mounting surface 20. A side plate 22 is attached to each end of the body 60 with a side plate fastener 24. A side plate cushion or gasket 26 is placed between the vehicle roof 12 including the vertical drop section 14 and the side plate 22. A front cushion or gasket 28 is placed between the front of the body 60 including the side plates 22 and the vehicle roof 12. A front seal 30 is securely attached to the side plates 22 and has a portion resting on the vehicle roof 12.

Figure 2:
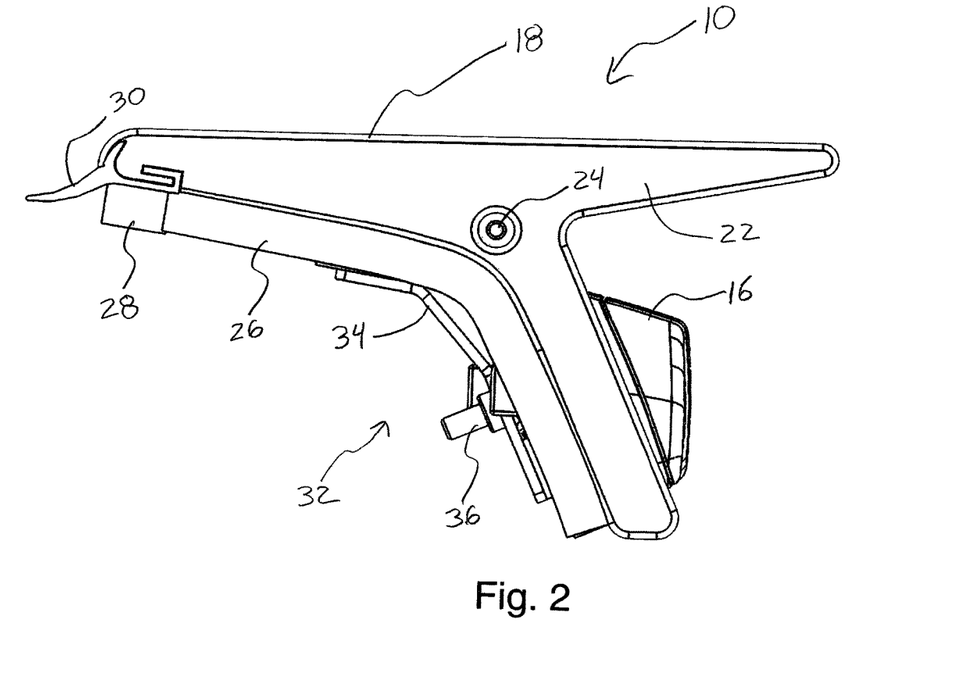
FIG. 2 is a side elevational view illustrating the present invention.

FIG. 2 is a side elevational view more clearly illustrating the clamp assembly 32 placed within an existing opening in the vehicle. The shaped clamp 34 is held within and attached to the vehicle with fastener 36 placed intermediate of or between the ends of the shaped clamp 34.

Figure 3:
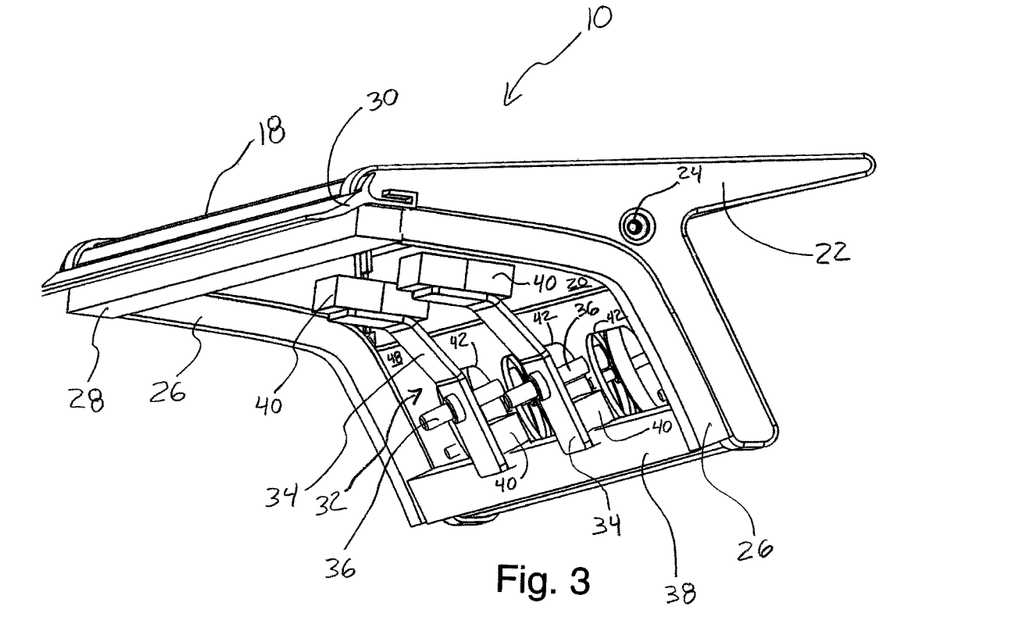
FIG. 3 is a perspective view illustrating an interior portion of the present invention.

FIG. 3 more clearly illustrates the clamp assembly 32 and how it is positioned within and held within the vehicle. FIG. 3 also illustrates the bottom cushion or gasket 38 and shaped bracket cushions 40. Shaped bracket cushions 40 are placed between the shaped bracket 34 and an interior surface of the vehicle. In FIG. 3 the openings 42 in the brake light vertical mounting surface 48 are illustrated.

Figure 4:
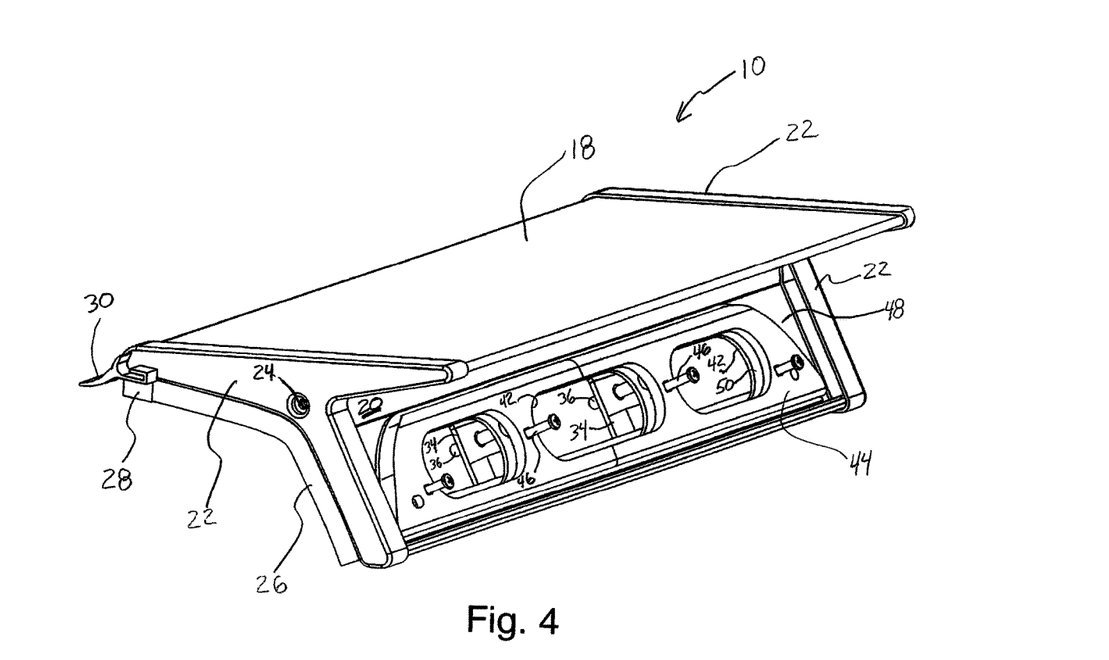
FIG. 4 is a perspective view illustrating an exterior portion of the present invention.

FIG. 4 is a rear view illustrating the brake light support 44 and looking through the openings 42 in the brake light vertical mounting surface 48. The brake light support 44 is held in place with fasteners 46. A brake light gasket 50 is placed between the brake light support 44 and the brake light vertical mounting surface 48. The shaped clamp 34 and the intermediate fastener 36 are seen through the openings 42.

Figure 5:
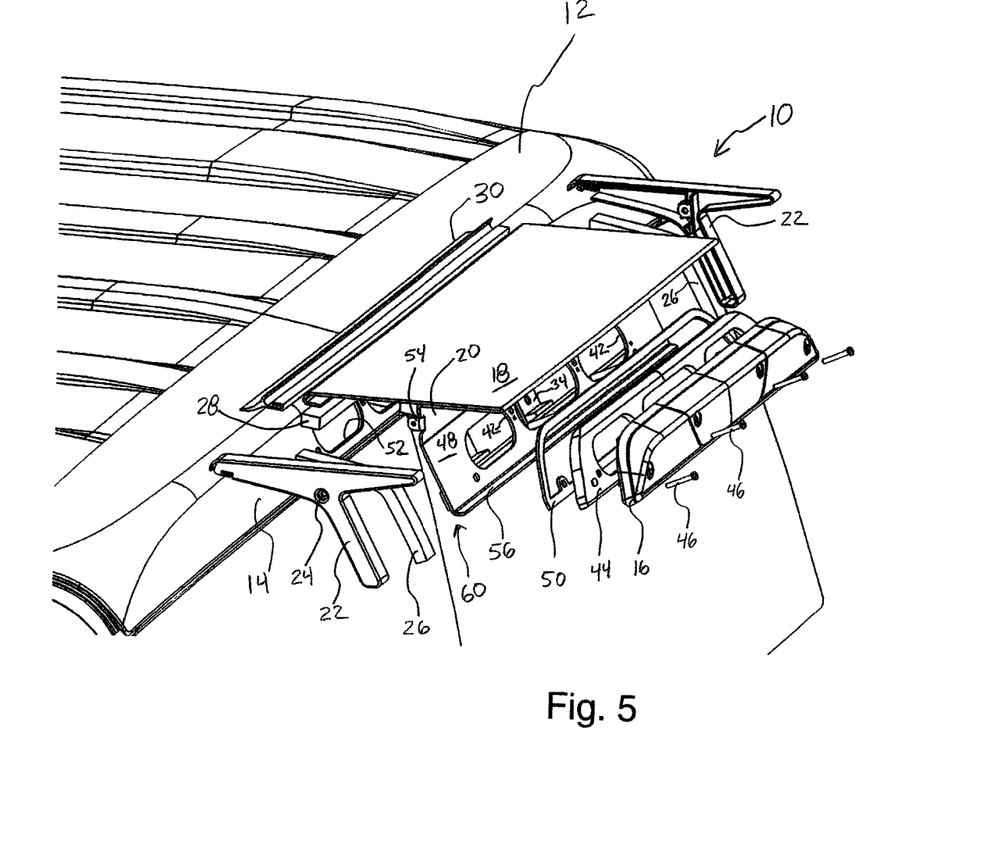
FIG. 5 is a perspective exploded view schematically illustrating the present invention from above.

FIG. 5 is an exploded perspective view more clearly illustrating the attachment of the accessory mount 10 to a vehicle roof 12 and a vertical drop section 14. Existing vehicle brake light openings 52 are formed in the vertical drop section 14 during the manufacture of the vehicle. Side plate mounting tab 54 is used to attach the side plates 22 to the body 60. The brake light vertical mounting surface 48 has a brake light ledge 56.

Generally the openings 52 are used to attach and service an existing brake light and wiring installed at the time of manufacture of the vehicle. Once the original or existing brake light is removed these openings 52 are used to attach the accessory mount 10 to the vehicle.

Figure 6:
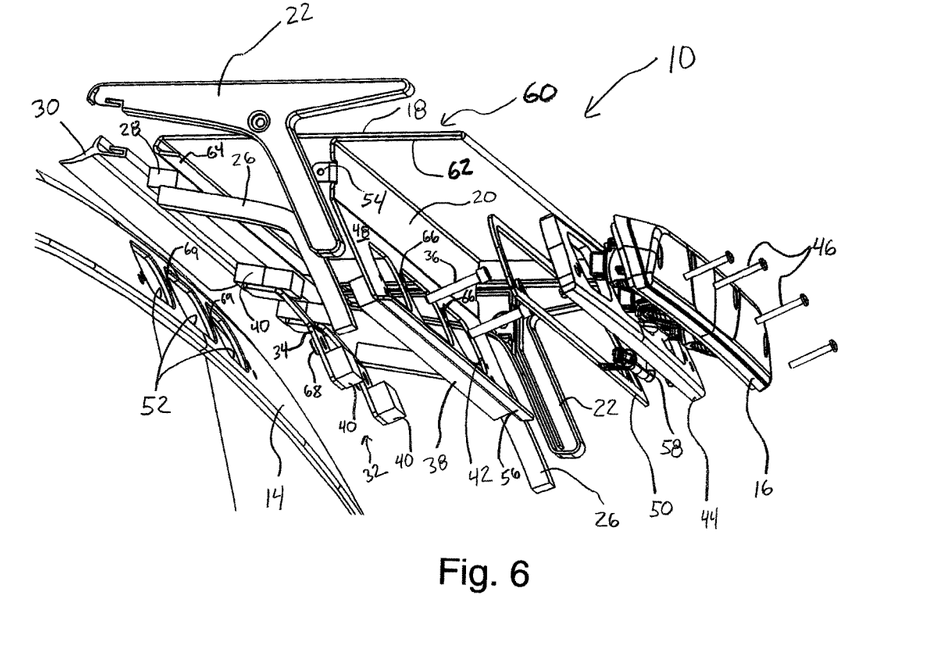
FIG. 6 is a perspective exploded view schematically illustrating the present invention from below.

FIG. 6 is an exploded view that more clearly illustrates the different components and structure of the accessory mount 10 of the present invention. A brake light electrical harness 58 is attached to the brake light 16 and connects to an existing electrical connection within the vehicle, not illustrated. The body 60 is made of sheet metal that has a horizontal mounting surface 18 and a rear bottom fold 62 and a front reverse fold 64. The brake light vertical mounting surface 48 forming a part of the body 60 has openings 42. Between each of the openings 42 is a hole 66 that is used to receive the fastener 36. The fasteners 36 attaches at one end to threaded holes 68 in the shaped clamps 34.

The accessory mount 10 is attached to the vehicle by inserting the shaped clamps 34 through the vehicle brake light openings 52 and angling the shaped clamp 34 so that the bracket cushions 40 extend above and below the vehicle brake light openings 52 and the threaded hole 68, intermediately positioned on the shaped clamp 34, is accessible through the vehicle brake light openings 52. The fasteners 36 are placed through holes 66 adjacent the openings 42 in the brake light vertical mounting surface 48 and threaded into threaded holes 68. When the fasteners 36 are tightened, the shaped clamp 34 is drawn towards the brake light vertical mounting surface 48 bringing the accessory mount 10 and the vertical drop section 14 together. The accessory mount 10 is thereby securely and easily attached to the vehicle utilizing an existing vehicle brake light opening 52 without any additional modification or need for any other openings to be made in the vehicle. The accessory mount 10 can also be easily removed and the vehicle restored to its ordinal condition.

Figure 7:
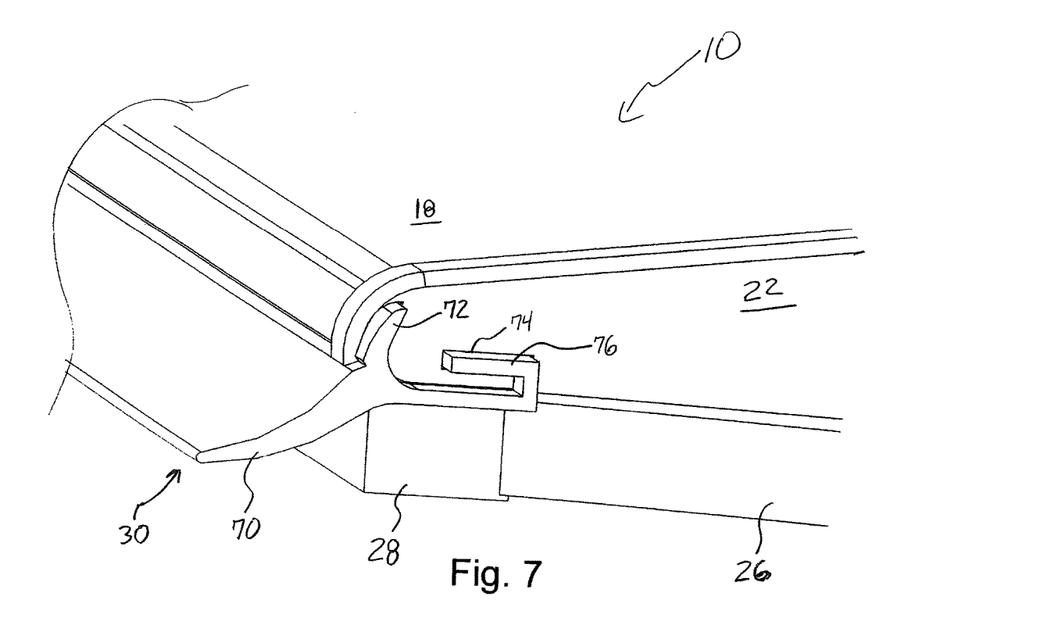
FIG. 7 is a perspective close up view of a portion of the present invention illustrating the structure of the front seal in more detail.

FIG. 7 more clearly illustrates the front seal 30 and its attachment to the side plate 22. The front seal 30 comprises a free end 70, a retained end 72, and a secured end 76. The secured end 76 is securely held within the secured end opening 74 formed within the side plate 22. The retained end 72 is held between the horizontal mounting surface 18 and an edge of the side plate 22. The free end 70 rests adjacent the vehicle roof. The front seal 30 works in conjunction with the front cushion 28 and the side plate cushion 26 to prevent wind or water from being driven below the accessory mount 10 and to protect the finish of the vehicle.

Figure 8:
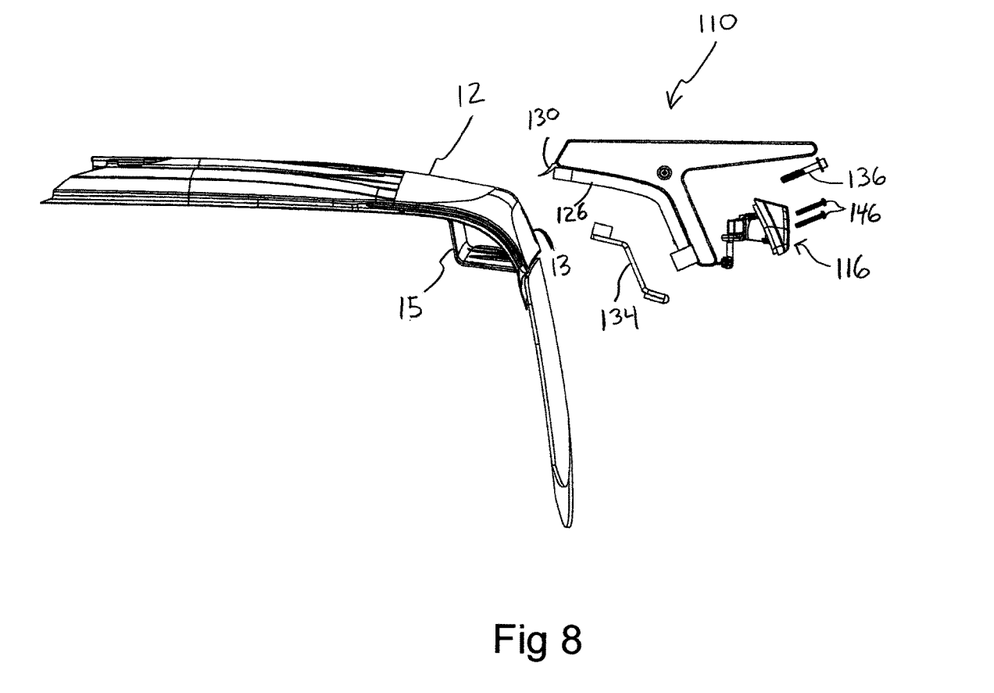
FIG. 8 is an exploded view of another embodiment of the present invention.
Figure 9:
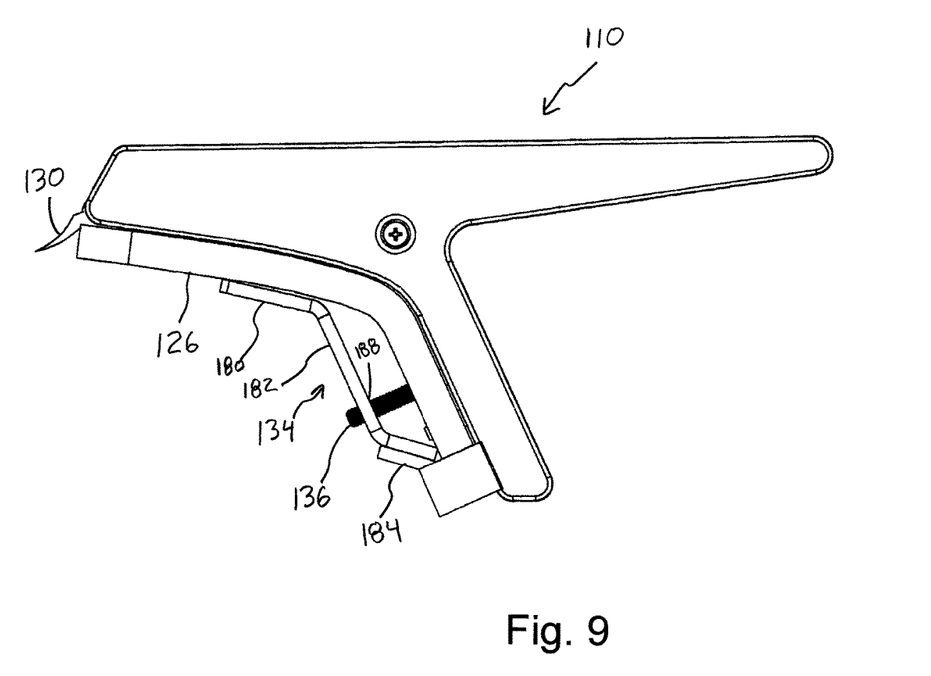
FIG. 9 is a side elevational view of the embodiment illustrated in FIG. 8.
Figure 10:
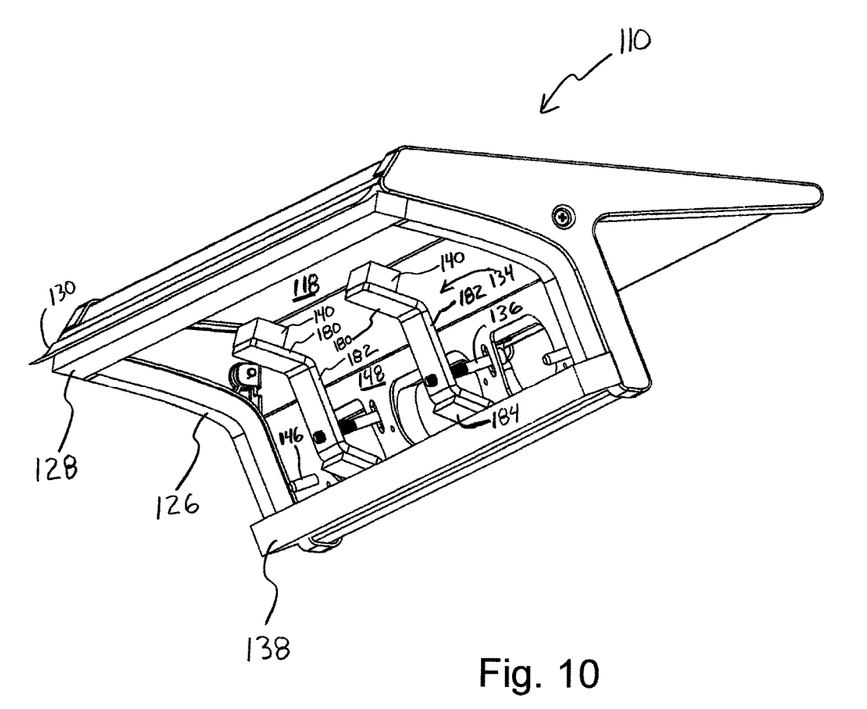
FIG. 10 is a illustrating an interior portion of the embodiment illustrated in FIG. 8.

FIGS. 8-10 illustrate another embodiment of the present invention. This embodiment has a slightly different structure and an improved shaped clamp.

The accessory mount 110 attaches to the roof 12 of the vehicle as illustrated in FIG. 8. An existing opening 13 is formed in the vehicle at the time of manufacture to hold the brake light assembly 116. A shield 15 in the interior of the vehicle protects the wiring and rear of the brake light assembly 116. When the brake light assembly 116 is removed the existing opening 13 is exposed. The accessory mount 110 having a shape to conform the roof 12 of the vehicle is placed on the roof 12 and covers the existing opening 13. Cushion or gasket 126 forms a seal between the accessory mount 110 and the roof 12 of the vehicle. A front seal 130 provides additional sealing preventing windblown water from entering under the accessory mount 110. The shaped clamps 134 are placed through the existing opening 13 and held in position by clamp fasteners 136. When the shaped clamps 134 are positioned and the clamp fasteners 136 are tightened the accessory mount is securely held on the roof 12 of the vehicle. Brake light fasteners 146 attach the brake light assembly 116 onto the accessory mount 110.

The shaped clamp 134 comprises an angled upper clamp foot placed adjacent an inner surface of the roof above the existing opening 13 and an angled lower clamp foot placed adjacent an inner surface of the roof below the existing opening. The upper clamp foot and the lower clamp foot are joined by a clamp body 182. A through hole is formed in the clamp body. The through hole is positioned closer to the lower clamp body 184 than the upper clamp body 180. A cushion 140 may be placed on the upper clamp foot. The positioning of the clamp fastener 136 adjacent the vertical mounting surface 148 in combination with the shape of the shaped clamp 134 causes the horizontal mounting surface 118 to rotate towards the roof 12 as the clamp fastener 136 is tightened. This compresses the front cushion or gasket 128 creating a good seal and secure attachment.

When the shaped clamp 134 is positioned inside the existing brake light opening of the vehicle the roof section closest to the upper edge of the existing brake light opening is placed between the upper clamp foot 180 and the horizontal mounting surface of the accessory mount and the roof section closest to the lower edge of the existing brake light opening is placed between lower clamp foot 184 and the brake light vertical mounting surface 148.

Figure 11:
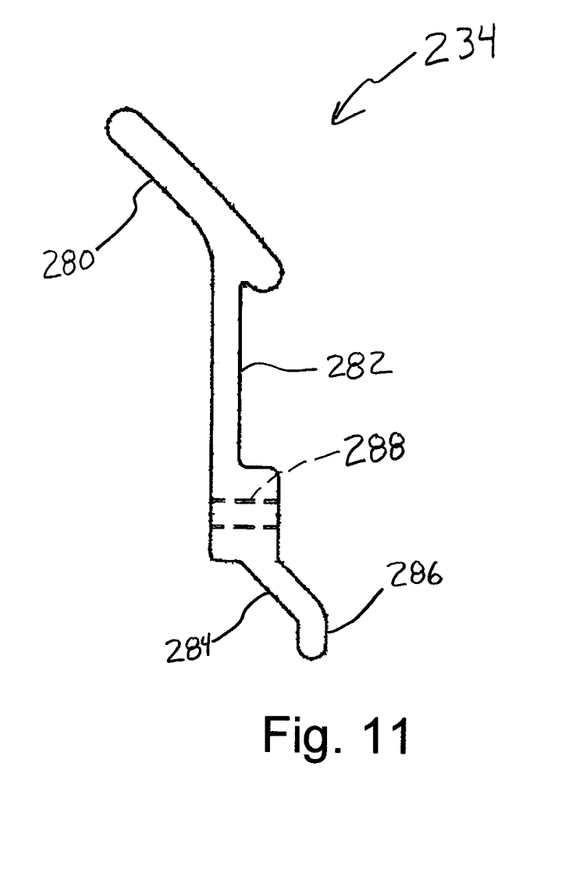
FIG. 11 is a side elevational view of another embodiment of a shaped clamp.

FIG. 11 is an elevational view of another embodiment of the shaped clamp 234. The shaped clamp 234 comprises an upper clamp foot 280 and a lower clamp foot 284 connected by a clamp body 282. A through hole 288 is formed in the clamp body 282. The through hole 288 is closer to the lower clamp foot 284 than the upper clamp foot 280. The lower clamp foot 284 has a toe 286. The upper clamp foot 280 and lower clamp foot 284 each have a longitudinal axis that are angled relative to the longitudinal axis of the clamp body 282. The longitudinal axis of the upper clamp foot 280 and lower clamp foot 284 intersect with the longitudinal axis of the clamp body 282 as an angle of approximately forty-five degrees. The longitudinal axis of the toe 286 is parallel to the longitudinal axis of the clamp body 282.

The present invention comprises a monolithic bent body and two side plates to form a horizontal and vertical mounting surface on which accessories, such as lights, emergency lights, sirens or other attachments may be mounted. The novel design of the accessory mount permits efficient manufacture and assembly as well as quick and easy installation onto a vehicle. The shape and positioning of the shaped clamp permit the accessory mount to be securely attached to the roof of the vehicle at multiple points on both the roof 12 and vertical drop section 14 of the roof.

What is claimed is:

1. An accessory mount for attaching to a vehicle through an existing opening in the vehicle comprising:
   a monolithic body having opposing body ends and a first mounting surface forming a first plane and a second mounting surface forming a second plane, the first plane transverse to the second plane, the second mounting surface having an opening formed therein;

a side plate attached to each of the opposing body ends of said monolithic body;

a shaped clamp having opposing clamp ends, said shaped clamp adapted to be inserted through the opening in the second mounting surface and into the existing opening in the vehicle, whereby said shaped clamp is capable of being positioned to span the existing opening in the vehicle; and a fastener attached to said shaped clamp between the opposing clamp ends, whereby said shaped clamp is capable of being inserted into the existing opening in the vehicle and positioned so as to attach the accessory mount to the vehicle with said fastener through the existing opening in the vehicle.

2. The accessory mount for attaching to a vehicle as in claim 1 wherein:

said shaped clamp comprises an upper foot positioned adjacent to the first mounting surface, a body, and a lower foot positioned adjacent the second mounting surface.

3. The accessory mount for attaching to a vehicle as in claim 2 further comprising:

a through hole placed in the body, said through hole positioned closer to the lower foot than the upper foot and adapted to receive said fastener.

4. The accessory mount for attaching to a vehicle as in claim 3 further comprising:

a cushion placed on the upper foot.

5. An accessory mount for attaching to a roof of a vehicle through an existing brake light opening in the vehicle comprising:

a body having opposing body ends and a first mounting surface forming a first plane and a second mounting surface forming a second plane, the first plane transverse to the second plane, the second mounting surface having an opening formed therein positioned to align with the existing brake light opening in the vehicle, said body having a shape conforming to the roof of the vehicle;

a side plate attached to each of the opposing body ends of said body, each of said side plates having a shape conforming to the roof of the vehicle;

a shaped clamp having opposing clamp ends, said shaped clamp adapted to be inserted through the opening in the second mounting surface and into the existing brake light opening in the vehicle, whereby the shaped clamp is capable of being positioned to span the existing brake light opening in the vehicle and contact the vehicle adjacent opposing ends of the existing brake light opening; and a fastener attached to said shaped clamp between the opposing clamp ends, whereby said shaped clamp is capable of being inserted into the existing opening in the vehicle and positioned so as to attach the accessory mount to the vehicle with said fastener through the existing opening in the vehicle.

6. The accessory mount for attaching to a roof of a vehicle through an existing brake light opening in the vehicle as in claim 5 wherein:

said shaped clamp comprises an upper foot positioned adjacent to the first mounting surface, a body, and a lower foot positioned adjacent the second mounting surface.

7. The accessory mount for attaching to a roof of a vehicle through an existing brake light opening in the vehicle as in claim 6 further comprising:

a through hole placed in the body, said through hole positioned closer to the lower foot than the upper foot and adapted to receive said fastener.

8. The accessory mount for attaching to a roof of a vehicle through an existing brake light opening in the vehicle as in claim 7 further comprising:

a cushion placed on the upper foot.

9. The accessory mount for attaching to a roof of a vehicle through an existing brake light opening in the vehicle as in claim 6 wherein:

the body has a body longitudinal axis and the lower foot has a lower foot longitudinal axis, wherein the lower foot longitudinal axis traverses the body longitudinal axis at an angle of substantially forty-five degrees.

10. An accessory mount for attaching to a roof of a vehicle through an existing brake light opening in the vehicle comprising:

a body having opposing body ends and a first mounting surface forming a first plane and a second mounting surface forming a second plane, the first plane transverse to the second plane, the second mounting surface having an opening formed therein positioned to align with the existing brake light opening in the vehicle, said body having a shape conforming to the roof of the vehicle;

a side plate attached to each of the opposing body ends of said body, each of said side plates having a shape conforming to the roof of the vehicle;

a cushion placed on said body and each of said side plates on a surface adapted to be placed adjacent the roof of the vehicle;

a shaped clamp having opposing bracket clamp ends, said shaped clamp comprising an upper clamp foot, a clamp body, and a lower clamp foot having a toe, and a through hole placed closer to the lower clamp foot than the upper clamp foot, said shaped clamp adapted to be inserted through the opening in the second mounting surface and into the existing brake light opening in the vehicle, wherein the shaped clamp is capable of being positioned to span the existing brake light opening in the vehicle and the upper clamp foot to contact the vehicle adjacent an upper end of the existing brake light opening and the toe of the lower clamp foot to contact the vehicle adjacent a lower end of the existing brake light opening opposite the upper end of the existing brake light opening; and a fastener placed through the second mounting surface and attached to said shaped clamp at the through hole between the opposing clamp ends, wherein when the fastener is tightened drawing the second mounting surface towards the vehicle the first mounting surface is rotated towards the roof of the vehicle, whereby said shaped clamp is capable of being inserted into the existing opening in the vehicle and positioned so as to attach the accessory mount to the vehicle with said fastener through the existing opening in the vehicle without accessing inside the vehicle or making any additional openings or holes in the vehicle.

11. An accessory mount for attaching to a roof of a vehicle through an existing brake light opening in the vehicle as in claim 10 further comprising:

a front seal attached to the accessory mount configured to prevent windblown water from entering under the accessory mount when attached to the roof of a vehicle.

\* \* \* \* \*